United States Patent
Zendle

(10) Patent No.: US 6,757,268 B1
(45) Date of Patent: Jun. 29, 2004

(54) METROPOLITAN WIDE AREA NETWORK

(75) Inventor: Allan M. Zendle, Oakton, VA (US)

(73) Assignee: Winstar Corporation, New York, NY (US)

(*) Notice: Subject to any disclaimer, the term of this patent is extended or adjusted under 35 U.S.C. 154(b) by 0 days.

(21) Appl. No.: 09/120,150

(22) Filed: Jul. 21, 1998

Related U.S. Application Data

(60) Provisional application No. 60/053,210, filed on Jul. 21, 1997.

(51) Int. Cl.[7] .............................................. H04Q 7/24
(52) U.S. Cl. .................. 370/338; 370/310; 370/395.51; 370/396; 370/401; 370/468; 455/3.03; 455/422; 375/212
(58) Field of Search ................................ 370/310, 312, 370/315, 319, 325, 339, 395.51, 396, 401, 468, 487, 402, 403, 404, 405, 406, 337, 338; 455/3.1, 5.1, 422, 16, 17, 3.01, 3.03, 3.04; 375/211, 219, 220, 212

(56) References Cited

U.S. PATENT DOCUMENTS

| | | | |
|---|---|---|---|
| 4,144,496 A | 3/1979 | Cunningham et al. | 325/53 |
| 4,352,202 A | 9/1982 | Carney | 455/151 |
| 5,260,673 A | 11/1993 | Pham | 332/103 |
| 5,276,703 A | 1/1994 | Budin et al. | 375/1 |
| 5,400,401 A | 3/1995 | Wasilewski et al. | 380/9 |
| 5,544,036 A | 8/1996 | Brown, Jr. et al. | 364/145 |
| 5,546,428 A | 8/1996 | Nam et al. | 375/308 |
| 5,577,056 A | 11/1996 | Malik et al. | 371/512 |
| 5,592,470 A | 1/1997 | Rudrapatna et al. | 370/320 |
| 5,719,872 A * | 2/1998 | Dubberly et al. | 370/487 |
| 5,745,837 A * | 4/1998 | Fuhrmann | 455/5.1 |
| 5,758,287 A | 5/1998 | Lee et al. | 455/450 |
| 5,771,449 A * | 6/1998 | Blasing et al. | 455/422 |
| 5,809,253 A | 9/1998 | Gallagher et al. | 395/200.58 |
| 5,890,055 A * | 3/1999 | Chu et al. | 455/16 |
| 6,016,313 A | 1/2000 | Foster, Jr. et al. | 370/330 |
| 6,081,518 A * | 6/2000 | Bowman-Amuah | 370/401 |

FOREIGN PATENT DOCUMENTS

| | | | |
|---|---|---|---|
| DE | 28 43 493 B2 | 4/1980 | H04L/27/20 |
| DE | 39 19 530 C2 | 12/1990 | H04L/27/20 |
| EP | 0 388 381 A1 | 9/1990 | H04L/27/18 |
| EP | 0 584 872 A1 | 3/1994 | H04L/27/20 |
| EP | 0719062 | 6/1996 | H04Q/7/36 |
| EP | 0755164 | 1/1997 | H04Q/11/04 |
| GB | 2 260 671 A | 4/1993 | H04L/27/20 |
| GB | 2 276 798 A | 10/1994 | H04L/27/20 |
| WO | WO 94/03004 | 2/1994 | H04L/12/28 |
| WO | 9525409 | 9/1995 | H04Q/7/36 |
| WO | WO 96/15601 | 5/1996 | H04L/29/06 |
| WO | 9625806 | 8/1996 | H04B/7/24 |

\* cited by examiner

Primary Examiner—Dang Ton
Assistant Examiner—Shick Hom
(74) Attorney, Agent, or Firm—Ohlandt, Greeley, Ruggiero & Perle, L.L.P.

(57) ABSTRACT

A wide area communication network includes at least two hub sites which are interconnected by a communication backbone Each hub site provides millimeter microwave wireless coverage in at least one sector. At least two remote sites reside in each sector and are coupled to a corresponding hub site via a point to multi point broadband millimeter microwave wireless system. The network preferably includes at least one service node which is accessible to the remote sites via the hub sites and backbone.

24 Claims, 9 Drawing Sheets

METROPOLITAN WIDE AREA NETWORK

This application claims the benefit of United States Provisional application, Ser. No. 60/053,210, entitled "Metropolitan Area Network Architecture and Telecommunication System above 18 GHz" which was filed on Jul. 21, 1997.

BACKGROUND

1. Technical Field

The present disclosure relates to a metropolitan wide area network for telecommunication systems. In particular, this invention relates to the integration of a wireless point to multi point system operating in the millimeter microwave radio range with an intelligent metropolitan area broadband backbone network to enable a variety of enhanced voice, broadband data and multimedia telecommunication services.

2. Description of Related Art

In the art, point-to-point narrow band, point to multi point narrow band and point to point broadband fixed wireless systems are generally known. Point to multi point radio technology is also a known technology which has been generally used for narrowband communications, such as voice. Narrow band systems are typically systems that are capable of generating at or below 1.544 megabits per second of data in a single circuit or channel, whereas broadband systems are capable of generating data rates above 1.544 megabits per seconds per circuit or channel. While narrowband "point to multi point" systems have been used for voice communications, point to multi point systems have not been generally applied to broadband telecommunications networks.

Today's narrowband point to multi point systems can aggregate a group of up to twenty four 64 kilobits per second channels together in what is called a "T1 line." However, this T1 line is still considered a narrowband facility when it is used to support multiple voice channels. Narrowband point to multi point systems have also been in use in Europe for voice telephone networks for several years.

Point-to-point broadband technology is also well known. Above 18 Gigahertz (millimeter microwave frequencies), and especially in the 37 Gigahertz or "GHz" to 40 GHz range (typically referred to as "38 GHz"), point-to-point broadband wireless systems are in use. When such broadband wireless links are engineered properly, their performance is functionally equivalent to that of fiber optic telecommunications.

Fixed wireless technology at frequencies of 18 GHz and above is gaining popularity as means for transmission of telecommunication services because of its low cost, rapid installation and ease of operation. Connecting two sites with point-to-point wireless service largely consists of installing roof top antennas on the top of two buildings, with the accompanying indoor equipment. Physical wires do not have to be connected between the buildings, representing a significant advantage over copper or fiber technology. Bringing fiber or copper to buildings entails tremendous labor and other costs associated with digging up streets, obtaining permits, etc. Because the deployment of broadband fixed wireless systems does not require civil construction in most instances, it is thus faster and more economical to install than traditional methods of "last mile" interconnection in metropolitan area telecommunications networks.

Current fixed wireless technology operating at frequencies of 18 GHZ and above (millimeter microwave wave) has a number of characteristics that make it an attractive commercial telecommunications transport medium. Fixed millimeter microwave wireless technology provides a high bandwidth path for voice, data, multimedia and video. Current technology permits link distances of up to five miles. Since all millimeter microwave propagation is subject to rainfall degradation, actual distance is a function of geographical location or "rain region." In climates where heavy rainfall is common, shorter link distances may be required to achieve performance and availability equivalent to that of fiber.

Millimeter microwave radio propagation generally requires unobstructed line-of-sight transmission. In practice, small diameter antennas are mounted on office building rooftops, and in some cases in office building windows. The size of the antennas vary according to the selected frequency band, but typically range from 12 to 24 inches in diameter. Manufacturers indicate mean time between failure (MTBF) statistics in excess of 10 years for the radio and modem components, indicating that the hardware is highly reliable. Current fixed wireless millimeter microwave technology is therefore ideally suited for high availability broadband point-to-point commercial voice and data applications ranging from 1.544 Megabits per second (T1) to 45 Megabits per second (DS3) capacities.

One example of a typical wireless point-to-point broadband commercial application is the interconnection of multiple servers in a campus local area network (LAN). Another such application is metropolitan wide area networking. Here multiple campus LANs within the same city are interconnected via wireless facilities operations at millimeter wave frequencies. Dedicated access to inter-exchange carriers (IXCs), Internet Service Providers (ISPs) and other alternate access arrangements are common point-to-point business applications for millimeter wave wireless links. For example, cellular and personal communication services (PCS) operators may deploy high availability wireless facilities in a millimeter microwave range in their backbone networks to support back haul between antenna sites, base stations and mobile telephone switching offices (MTSO's). Wireless point-to-point millimeter microwave technology is also being used to provide mission critical protection channels and other point-to-point alternate routing where extension is required from a fiber network to a location that is not served by fiber. Finally, interconnection with the public switched telephone network (PSTN) for the provision of local dial tone by competitive local exchange carriers (CLECs) utilizing point-to-point millimeter microwave wireless technology is becoming increasingly popular.

FIG. 2 illustrates a basic point-to-point wireless facility providing customer interconnection to services. This connection will support broadband (data, video etc.) and narrowband (voice) applications. A customer building is shown as 200 and may contain multiple tenants. It is connected to another building 202 that houses a telecommunications network switch 203. These buildings are connected by a wireless link between two roof top antennas: one antenna 204 at the customer building, the other antenna 205 at the building housing the switch 203. The bandwidth of this connection could be up to 28 T1 circuits, or DS3 (45 Megabits per second). The switch 203 connects to the PSTN 206, or public switched telephone network for local service, and to long distance networks 207 for long distance service. The switch 203 is also able to provide dial up access to the Internet 208.

FIG. 3 is a representation of an exemplary system defined channelized spectrum allocation plan suitable for use in millimeter microwave frequencies. For example, the FCC spectrum allocation plan for an exemplary millimeter microwave band at about 38 GHz consists of 14 total channels. Each channel is 100 MegaHertz (MHZ) in bandwidth. Each 100 MHZ channel consist of two 50 MHZ sub channels, one sub channel to transmit and the other sub channel to receive.

These two 50 MHZ sub channels are separated by 700 MHZ of spectrum. As shown in FIG. 3, sub channel 1A is 50 MHZ wide and it is a transmitting channel, whereas sub channel 1B is 50 MHZ wide and it is a receiving channel. Sub channel 1A is separated from sub channel 1B by 700 MHz. This band plan yields 14 channels (1400 MHZ or 1.4 GHz) of spectrum in the FCC allocated 38 to 40 GHz range. Similar frequency channel allocations can be established (and planned) in other millimeter microwave frequencies as well, including 24, 28 and 40 GHz in the United States and 23 and 26 GHz in Europe. For example, in the 28 GHz LMDS band (in the United States) spectrum is largely allocated in a single 850 MHZ wide spectral block. However, such a block spectrum allocation can be subdivided into system defined channels, to achieve the same result to that shown in FIG. 3.

Referring to FIG. 4, a basic spectrum management problem associated with the use of point-to-point wireless systems in a metropolitan area using a channelized spectrum allocation as illustrated in FIG. 3 is shown. Because buildings are close to each other in a metropolitan area, the broadcast of information over wireless links may overlap, making the use of the same channel (1A/1B) in contiguous systems impossible. In this figure, one antenna from one building is transmitting its signal to the antenna of the intended receiver, but a portion of the signal is also being received by the antenna on the adjacent building. Such signal corruption is termed "co-channel interference."

In FIG. 4, a host building 401 containing a switch 402 is connected via four rooftop antennas 403A, 403B, 403C and 403D respectively to remote buildings 404A, 404B, 404C and 404D, each with its own corresponding rooftop antenna. Shown between these buildings is a conceptual representation of the spectrum being utilized by each of these point-to-point wireless systems. As buildings get close together, transmission signals between buildings begin to overlap. To prevent the co-channel interference described in the preceding paragraph, different channels must be used to connect buildings that are in close proximity. For instance, channel 1A/1B is used for building 404D and channel 2A/2B is used for building 404C. Even though channel 1A/1B partially overlaps the transmission of 2A/2B, the use of different frequencies (channels) by the two systems provides protection from co-channel interference. Thus the antenna of one building may be transmitting a portion of its signal to the wrong receiving antenna, but each system is "tuned" to a different frequency and transmission from neighboring systems using other frequencies is ignored.

The frequency management technique shown in FIG. 4 avoids co-channel interference in wireless networks deployed in dense urban areas, however the use of additional channels to avoid co-channel interference does not maximize the information transport capacity of the licensed spectrum and is therefore inefficient. A solution to this problem is needed.

FIG. 5 illustrates an additional spectrum management problem associated with point-to-point systems. Building 501 connects to Building 502 through channel 1. Building 503 connects to building 504 through channel 2. The solid connection lines 505, 506 represent the wireless transmission that is intended. However, because the "transmit beam" is about 2 degrees at the source, signals can be received by other systems that are not planned but happen to be in the range of the transmit beam of the originating system. The dotted line 507 represents such a case, where the system in building 4 incorrectly receives the transmission of the system in building 1. If two distinct frequencies were used, there would be no co-channel interference. Once again, frequency management in point-to-point wireless networks requires the use of multiple channels to avoid interference rather than allowing the spectrum to be used to drive incremental bandwidth.

Rooftop space is expensive and in many cases there are restrictions on the number, size and position of antennas deployed on a roof. Because point-to-point systems use separate antennas for each wireless connection, space becomes a limiting factor on building rooftops. As the number of point-to-point systems located on a building increases, not only do spectrum management considerations limit the number of systems which can be deployed, but the physical space available for each antenna on the roof also constrains the number of systems. Thus, a solution is required which permits the expansion of wireless network capacity, and thus the number of users, without a corresponding increase in the number of antennas rooftops.

Point-to-point systems provide users with what is called a full period connection. Full period connections are "always on" (connected and active), awaiting the transport of information. Full period wireless connections utilize dedicated spectrum which, once assigned, is unavailable to other users. Point-to-point wireless systems are therefore appropriate for applications involving continuous or lengthy transmissions. Point-to-point systems do not efficiently support variable bit rate or "bursty" data services where the requirement for bandwidth is not constant but rather variable. Bandwidth utilized by point-to-point systems for variable bit rate applications is wasted, as each system utilizes the allocated channel on a full time "always on" basis regardless of the amount of information or the duration of transmissions on the link. A solution is required to more efficiently utilize spectrum for "bursty" data services like LAN to LAN data transmission.

It is an object to create a "full featured" local metropolitan area broadband telecommunications network infrastructure capable of supporting advanced voice and data services.

It is another object to use fixed wireless telecommunications technology as a key enabler of broadband local access to a metropolitan area telecommunications network offering advanced voice and data services.

It is an object to maximize the utilization of allocated spectrum available in local metropolitan area broadband telecommunications networks.

It is an object to overcome the spectrum management limitations associated with the use of point-to-point fixed wireless telecommunications systems.

It is an object to allow the utilization of multiple channels to drive additional network capacity in local metropolitan area broadband telecommunications networks.

It is an object to minimize the number of wireless telecommunication systems required on rooftops to provide access to local metropolitan area broadband telecommunications networks.

SUMMARY

In accordance with one form of the present network, a wide area communication network includes at least two hub sites which are interconnected by a communication backbone Each hub site provides wireless coverage in at least one sector. At least two remote sites reside in each sectors and are coupled to a corresponding hub site via a point to multi point broadband wireless system. The network preferably includes at least one service node which is accessible to the remote sites via the hub sites and backbone.

In accordance with another form of the present network, a broadband local metropolitan area telecommunication network provides fixed broadband wireless local loop access to a plurality of subscribers. The subscribers include a subscriber radio unit operating on a millimeter microwave band frequency corresponding to a cell sector in which said subscriber resides. At least one of the subscribers has a plurality of associated customer premise equipment and includes means for performing statistical multiplexing among the plurality of customer premise equipment the subscriber radio unit. The network includes a plurality hub sites which are interconnected by a Sonet based back bone. The hub sites include a plurality of hub site radio units which operate on a selectable frequency with at least one radio unit corresponding to a cell sector. The hub sites further include means for dynamically allocating communication bandwidth among a plurality of subscribers within each said cell sector. The network preferably includes a plurality of value added service nodes which are coupled to the backbone and are accessible to subscribers through the hub sites and backbone. The network further includes a central operations node which is connected to each of said hub sites by a control network and provides remote access and control of the hub sites as well as remote control subscriber access to the value added service nodes.

These and other features, objects and advantages of the present network embodiments will become apparent from the following detailed description of illustrative embodiments thereof, which is to be read in connection with the accompanying drawings.

DETAILED DESCRIPTION OF PREFERRED EMBODIMENTS

1. Network Topology

The present network utilizes a fixed wireless microwave scheme preferably operating in the millimeter microwave frequency region (i.e. frequency bands of 18 GHz and above), which allows a many to one relationship between hub systems and remote systems located in customer buildings. This technology, termed "multiple access" or "point to multi point," can support traditional voice and data telephony services as well as commercial and residential broadband multimedia services by combining improvements in spectrum efficiency (and thus available bandwidth) with enhanced intelligence in the metropolitan wide area network.

Figure 6A:
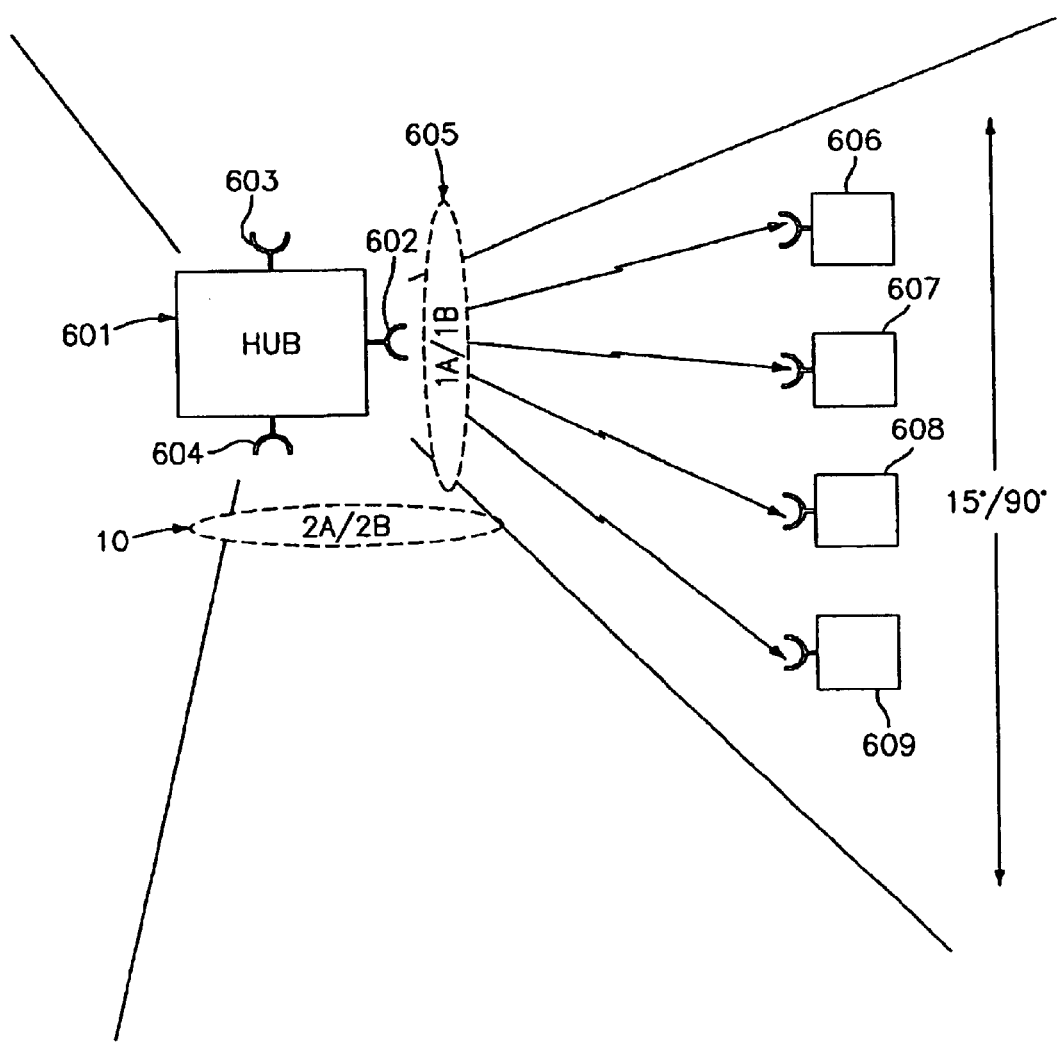
FIG. 6A is a diagram illustrating a fixed wireless point to multi point implementation in which there exists a one to many relationship between hub and customer systems within a sector employed in the present system.

FIG. 6A illustrates a point to multi point millimeter microwave wireless system, characterized by a "one to many" relationship between hub and customer building radio systems. In FIG. 6A, a hub site 601 is equipped with antennas 602, 603 and 604. Antenna 602 transmits to a "sector" 605, which covers the physical space occupied by multiple subscriber buildings 606, 607, 608 and 609. Antennas on buildings 606, 607, 608 and 609 in sector 605 all communicate with the single hub antenna 602 of sector 605. Sectors can be from 15 to 90 degrees wide. All of the buildings in a sector generally utilize a single channel, so co-channel interference is no longer an issue for buildings within the same sector.

To prevent co-channel interference at the edges of sectors, the hub site 601 assigns frequencies to adjacent sectors which are substantially separated from each other. For example, sector 602 may be assigned channel 1A/1B and sector 604 then assigned channel 2A/2B. Thus point to multi point systems permit full utilization of each channel assigned within a sector to transport information, in contrast to the spectrum management requirements of point-to-point systems which require the utilization of multiple channels in the same geographical area merely to avoid co-channel interference.

Figure 6B:
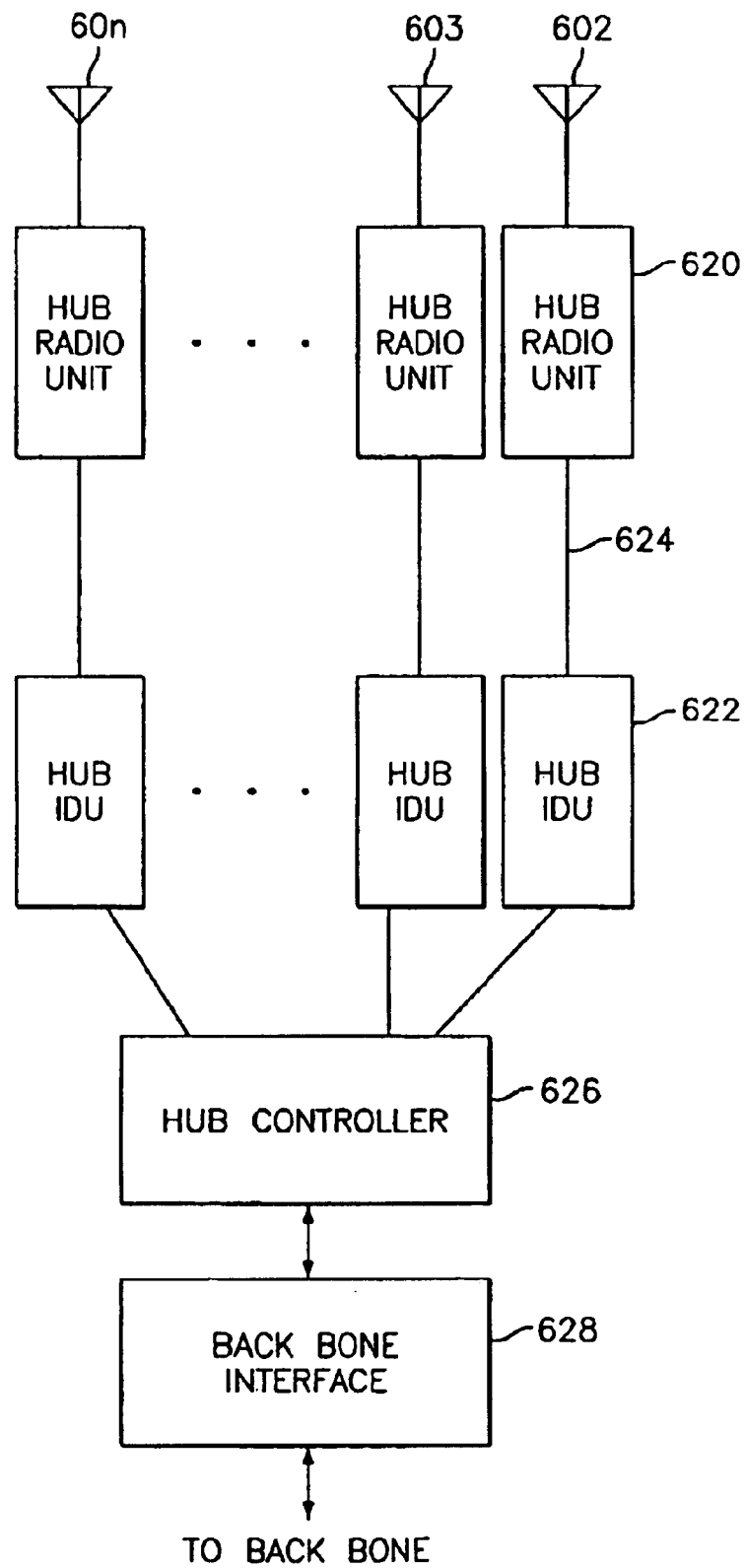
FIG. 6B is a block diagram further illustrating the hub of FIG. 6A as used in the present network.

FIG. 6B illustrates an exemplary embodiment of a hub site 601 for use in the present network. Antennas 602, 603 . . . 60n, correspond to frequency channels within the selected millimeter microwave band. Generally, one frequency channel is assigned to a corresponding cell sector 605. However, in cases where additional bandwidth is required, the present network provides for the assignment of multiple channels to one or more cell sectors. Each antenna preferably includes a corresponding hub radio unit 620. To avoid signal losses associated with coaxial lines and waveguides at millimeter microwave frequencies, the hub radio units are preferably coupled to a corresponding antenna as an integral unit which is mounted on a roof top or tower.

The hub site also includes hub indoor units 622 which are coupled to the hub radio units (IDU) 620 via an interfacility link 624. The interfacility link 624 is a wide band connection, preferably taking the form of a fiber connection. The hub IDU's are connected to one or more hub controllers 626 which manage the operation and data transfer within the hub site 601. A backbone interface 628 is included to enable connection and data transfer with a network backbone. An advantage of the modular nature of this architecture is that the hub IDU can be a common element which is independent of the selected frequency band. Only the hub radio units 620 need to be altered in order to permit operation in the numerous millimeter microwave bands which are available world wide.

Figure 7:
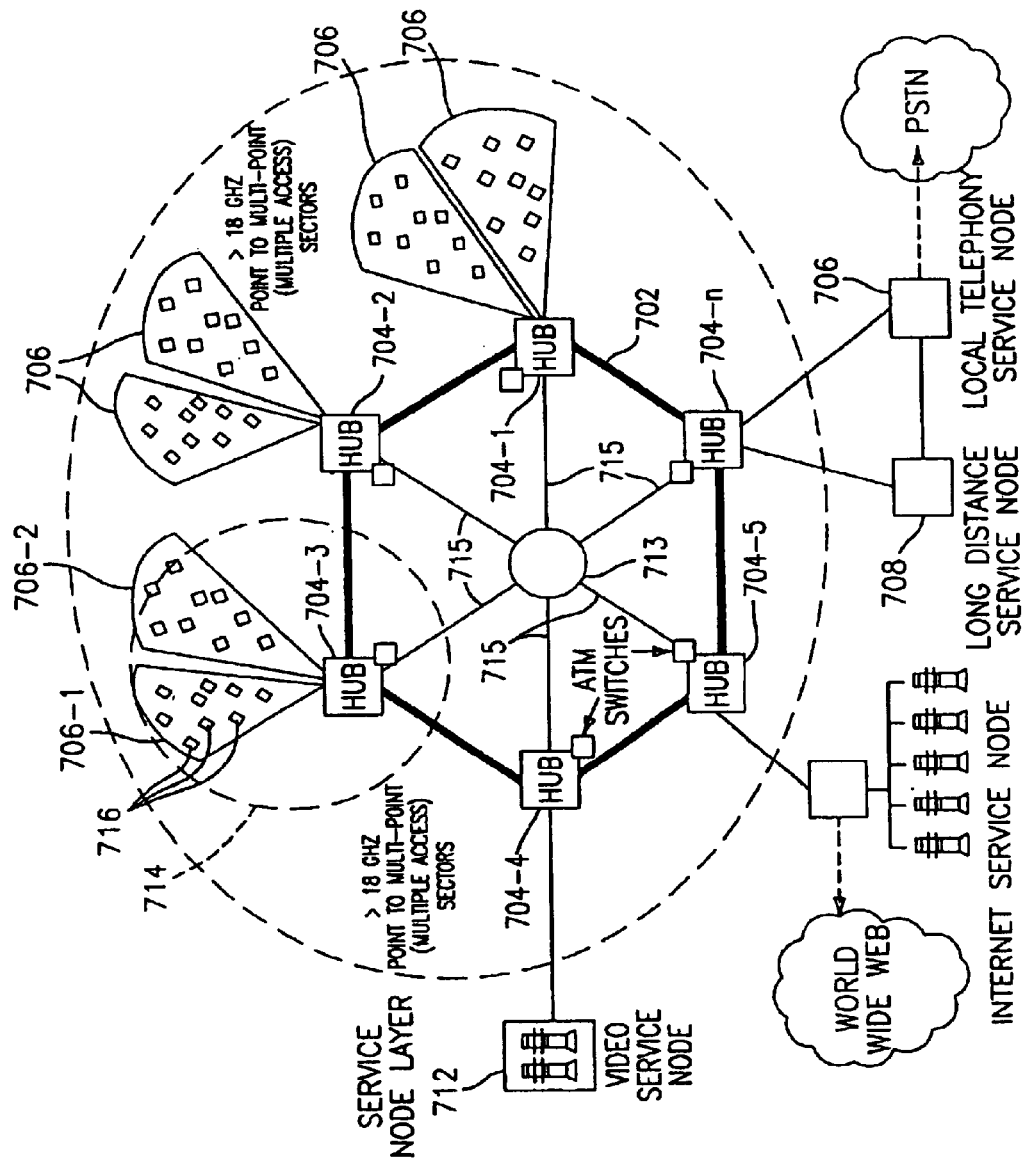
FIG. 7 is a diagram illustrating the present local metropolitan area broadband telecommunications network utilizing point to multi point fixed wireless technology operating in a millimeter microwave band to provide customer access to a backbone network and various telecommunications services.

FIG. 7 illustrates an embodiment of the present network in a commercial metropolitan area network utilizing multiple access wireless technology in the millimeter microwave frequency band. The network includes a broadband backbone 702, which can be implemented using fiber, copper or wireless technology. The large squares located on the ring represent point to multi point hubs 704, each covering at least one cell sector 706. In a commercial urban environment, cell sectors 706 are deployed such that bandwidth is directed toward geographic locations with appropriate building (customer) density. Once on the backbone 702, customer traffic is routed to any number of network nodes providing value added services. Examples of such service nodes are local exchange carrier switches 706, inter-exchange carrier switches 708 and Internet access points 710 and video service points 712. The present network also includes at least one central operations node 713 which is connected to each of the hubs 704 through a control network 715, such as a frame relay network.

The architecture of the millimeter microwave point to multi point wireless network generally consists of cells 714 with a 3–5 mile diameter (1.5–3 mile link distances). Each cell 714 consists of a number of sectors 706-1, 706-2, ..., 706-n, ranging in sector width from 15 to 90 degrees. A hub 704 is located in the center of each cell, and multiple remote subscriber systems (subscribers) 716 located in customer buildings within a sector communicate with hub radio equipment to establish wireless links. Bandwidth within a given sector is allocated among the remote subscriber systems provisioned in that sector by the corresponding hub 704. A sector may utilize the full bandwidth of a single allocated channel, or multiple channels can be "stacked" in a sector to meet overall customer demand for bandwidth. When multiple channels are employed an additional hub radio unit 620 and antenna for that sector are added to the hub 704.

The assignment of the optimum sector width is a non-trivial problem. One design objective is to minimize the cost of the required Effective Radiated Power (ERP). Narrow sectors yield higher antenna gain, so less power is needed to achieve a given ERP. However each sector requires it's own radio system, so narrow sectors increase the equipment cost required to cover a given geographical area. In the final analysis, hub design is a function of overall customer demand for capacity and the geographical distribution of customer locations.

Preferably, in the present point to multi point metropolitan area network, hubs 704 are interconnected on the backbone 702 by fiber or high capacity microwave radio facilities in a SONET ring configuration. Service nodes such as Inter exchange Carriers 708, Internet Service Providers 710, Local PSTN switches 706 and video sources 712 are interconnected to the fiber ring, in some cases via co-location with the hubs. Thus, once customers are connected via wireless access links to the network, any and all services supported by the various service nodes will be accessible.

This network approach requires a transport and routing capability on the backbone to facilitate connections between multiple customer locations and between customer locations and network service nodes. Asynchronous Transfer Mode (ATM) is the preferred transport layer protocol for the present metropolitan area network architecture. It is also envisioned that more traditional connection-oriented or synchronous telephony transport protocols will be utilized as operators transition to full ATM networks over time. For this reason, both ATM (OC-3c) and STM (DS-3) interfaces are preferably included between hubs 704 and the backbone 702.

2. Wireless ATM

This network architecture utilizes Asynchronous Transfer Mode (ATM) as primary means of transport in the network. ATM is a packetized transmission technology which organizes information into cells. The cells have a "header" and a "payload". The header describes what kind of data is in the payload and where the data is to terminate. The cells propagate through the network via diverse paths and can arrive out of sequence at the point of termination. Header information contained in the cells permits reconstruction of the correct cell sequence prior to delivery to the customer premise equipment. ATM cells can transport many standard telecommunications voice, data and video services by encapsulating the data in the payload. Thus, ATM is capable of integrating voice, data and video in a single telecommunications transport network.

A key architectural element of the present network is the use of ATM in the point to multi point system operating in the millimeter microwave spectrum which provides high bandwidth. Customer specific services (Ethernet, Frame Relay, DS-1, DS-3, ISDN, Voice) are encapsulated in the ATM payload between subscribers 716 and hub 704. Thus services which are most efficiently handled by a cell-based protocol benefit from end-to end ATM transport in the network, while services which for the time being must be channelized on the backbone are time division multiplexed at the hub 704. In either case, the transport of all services via ATM over the air enables important bandwidth on demand functionality in the network.

3. Modulation and System Capacity

Wireless equipment utilizing modulation techniques such as QPSK and 4FSK, yield an effective data rate of one bit per Hertz per second, For example, in a millimeter microwave band where spectrum is allocated in 50 MHZ full duplex channels (that is, 50 MHZ of spectrum in each direction for a total of 100 MHZ per licensed channel), the maximum point-to-point data rate of today's fixed wireless technology is 45 Mb/s, or DS-3. Higher order modulation techniques such as 16 QAM and 64 QAM, along with improvements in overall system gain will yield data rates of 4–5 bits per Hz per second or more. This translates to a significant increase in available bandwidth per channel. Thus data rates of OC-3 (155 Mb/s) per channel per sector and higher are attainable at millimeter microwave frequencies. Spectrum efficiencies in the range of 6–8 bits per Hz per second are expected. Multi sector, multi channel cells supporting overall data rates of several gigabits per second of available bandwidth are readily achievable based on relatively conservative engineering. Less conservative designs will yield higher cell capacities.

4. Bandwidth on Demand

Because data is encapsulated into cells for transport by the wireless network, it is possible to utilize radio spectrum more efficiently than would otherwise be possible in non-ATM wireless implementations. This is the result of a technique called "statistical multiplexing." Statistical multiplexing takes advantage of the random origination of data transmission in a system and the fact that all users do not require bandwidth at all times. Statistical multiplexing allows cells containing data originated by different users to be transported by the minimum required spectrum. In this sense, users share the allocated spectrum in a wireless ATM network, and the aggregate bandwidth requirement of all users in the system is served by the spectrum that is available within the system at any given moment in time.

This results in "statistical gain" in data capacity which allows telecommunications network operators to "oversubscribe" wireless links based on the assumption that all users in a given subscriber location (e.g. multi-tenant office building) will not require all capacity allocated to that location at all times. Over subscription rates (statistical gain) as high as 10 to one (10:1) are possible for links on which the majority of the information is transported in short bursts ("bursty data") as in the case of LAN-LAN communications. Statistical gains of 2:1 or 3:1 are more typical of networks in which the mixture of traffic is more heavily skewed toward voice or other services requiring point-to-point connections through the network (circuit) for the duration of the communication session.

ATM cell headers also contain parameters which allow individual cells to be prioritized. Thus cells with the highest priority are transported across the network instantly, while cells with lower priorities may be delayed until the higher priority cells have been switched. This attribute of ATM permits the support of services with varying "Quality of Service", or QOS. When this priority system is used in conjunction with statistical multiplexing, it allows information to be transported over wireless networks very efficiently. For instance a large file can be broken into cells and transmitted over the network with other cells of smaller files interspersed in the packet stream. Thus, the small files do not have to wait for the large file transmission to be completed, and the network operates more efficiently overall.

Dynamic bandwidth allocation between subscribers 716 within a given sector 706. Thus, momentary requirements for high bit rate bursts to a given subscribers 716 are met by utilizing bandwidth within the sector 706 not in use by other subscribers at the time. This is accomplished via variable on-demand assignment of time slots (Time Division Multiple Access or TDMA) or frequencies (Frequency Division Multiple Access or FDMA) to subscribers, or through a combination of both multiplexing techniques (Demand Assigned Multiple Access or DAMA).

When these techniques to dynamically allocate bandwidth between buildings in a sector are combined with ATM statistical multiplexing (over subscription) of bandwidth allocated to customers within individual buildings, the result is a tremendous increase in the information transport capacity of wireless spectrum utilized in networks of the present invention. Capacity is further increased with the use of highly efficient modulation schemes such as 16 QAM and 64 QAM.

5. Hubbing Architecture

The present system utilizes a deployment strategy known as "hubbing", which concentrates one end of many wireless links on a single building rooftop or "hub". Each hub 704 can connect to many remote radio systems 716 using wireless links. Hubs 704 in a metropolitan area may be interconnected in a ring, mesh or other backbone network topology via wireless, fiber, or other high capacity telecommunication facilities. Hubs 704 are equipped with ATM switching or TDM multiplex equipment to bridge wireless links across the backbone 702 to establish connections between subscribers or to connect subscribers to other locations on the network to access services. Via hubbing, networking is employed to significantly increase the effective range of wireless access links as well as to provide access to a variety of voice, data and multimedia services.

Figure 1:
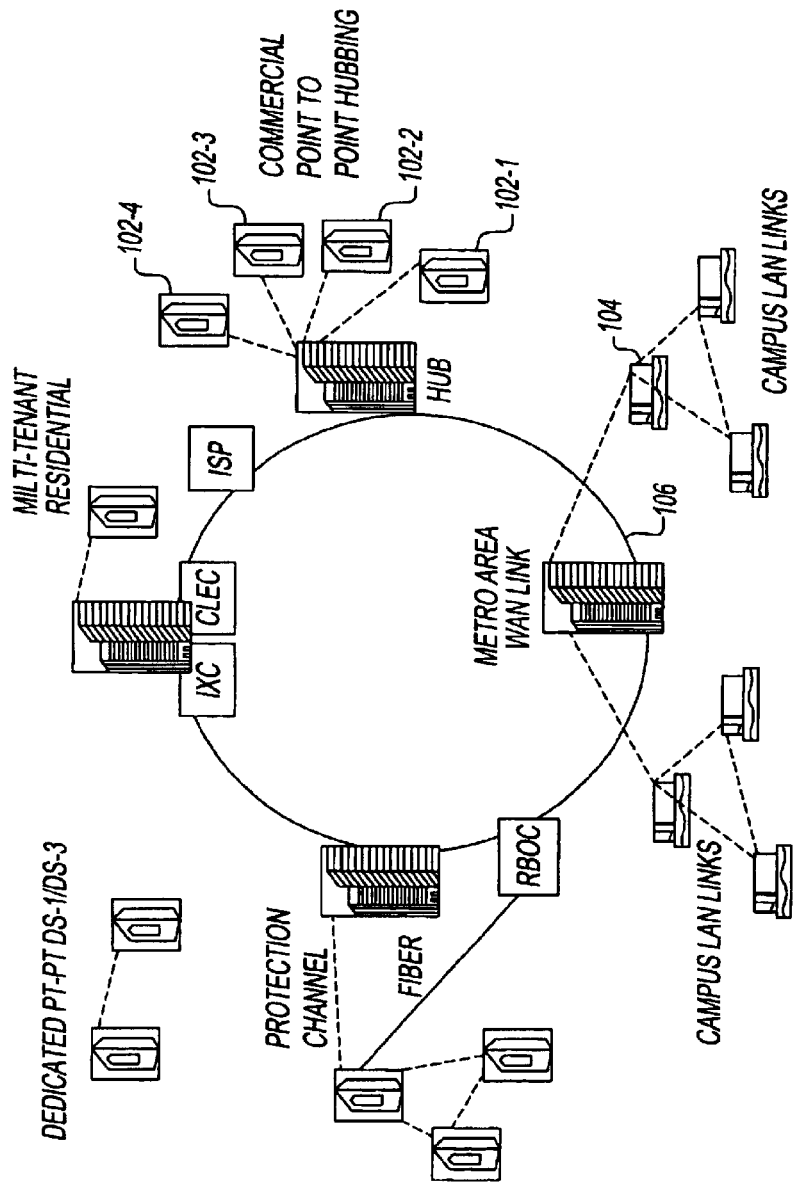
FIG. 1 is a pictorial diagram illustrating a local metropolitan area broadband telecommunications network utilizing fixed wireless point-to-point systems operating at 38 GHz to provide customer access to a local metropolitan area broadband telecommunications network.
Figure 2:
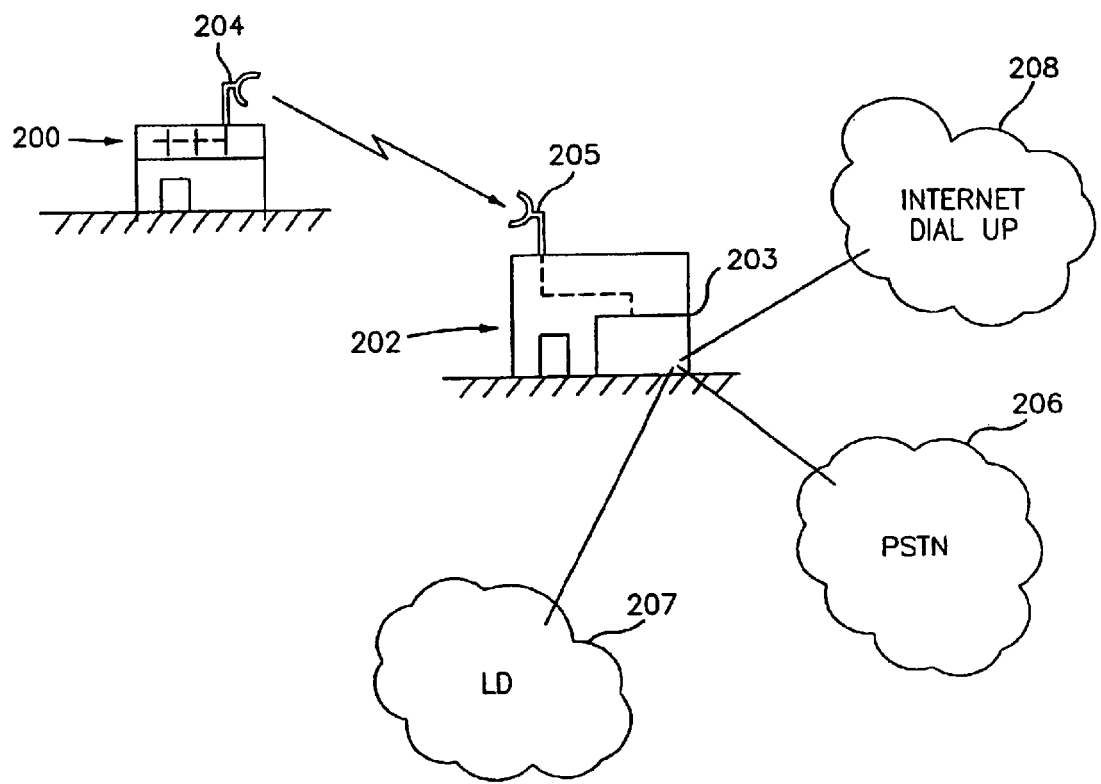
FIG. 2 is a pictorial diagram illustrating a typical point-to-point system configuration known in the art for providing customer access to telecommunications services via a switch.
Figure 3:
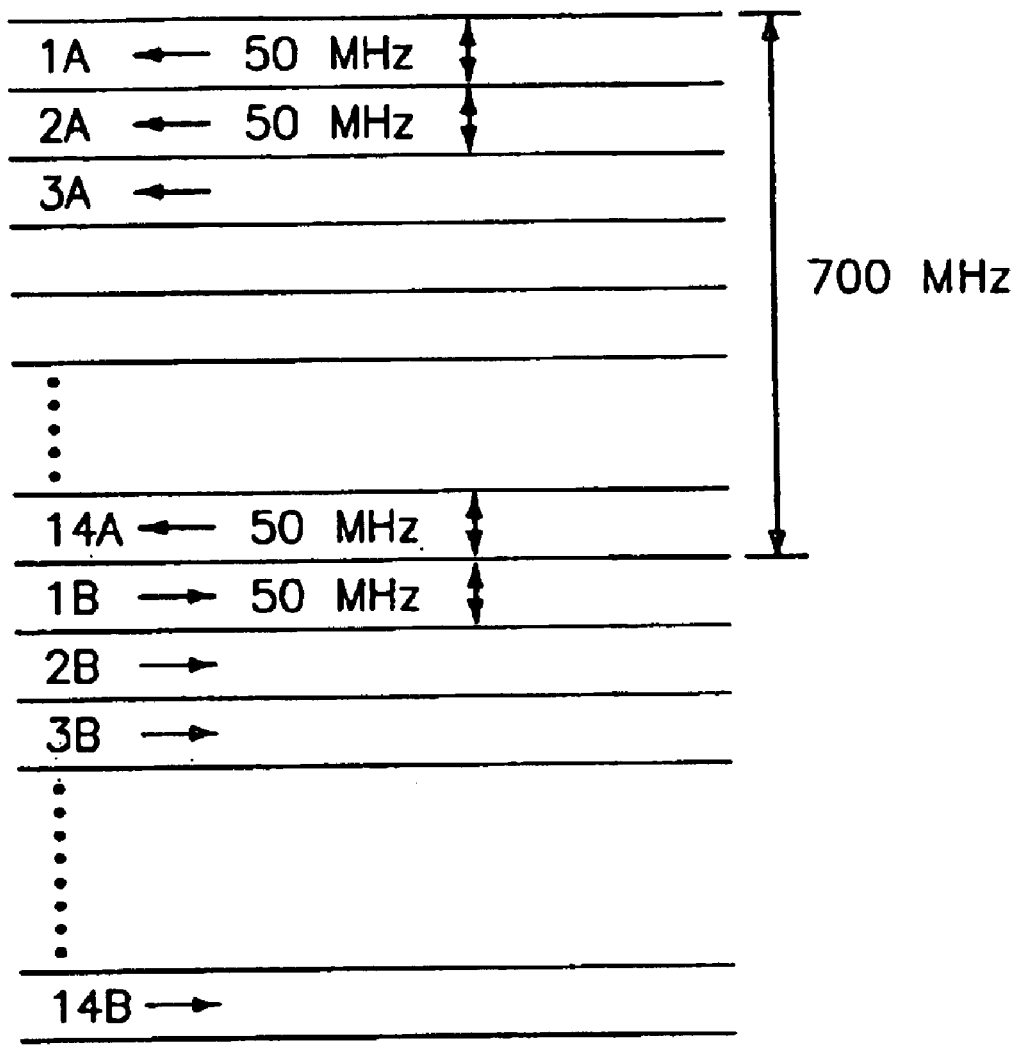
FIG. 3 is a pictorial diagram illustrating a spectrum allocation plan having allocated or system defined 100 MHZ channels divided into 50 MHZ subchannels for the transmission and reception of signals, wherein each transmit and receive subchannel is separated by guard band of spectrum.
Figure 4:
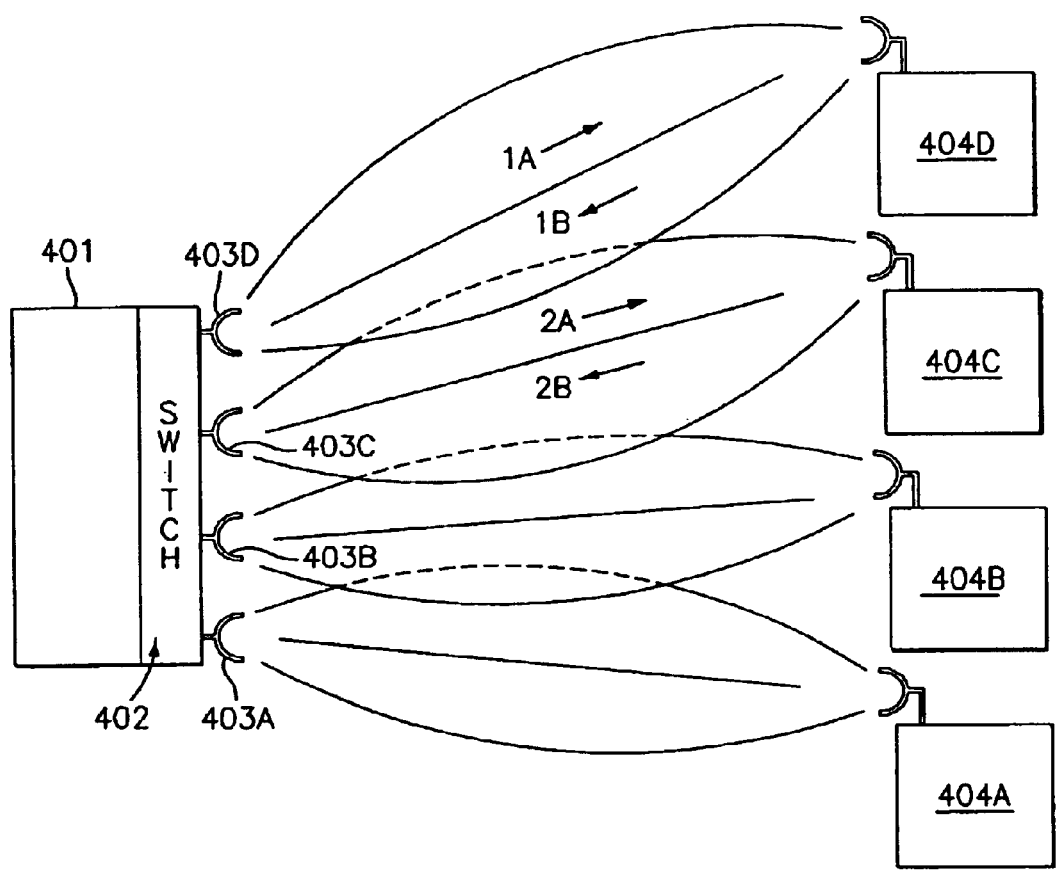
FIG. 4 is a pictorial diagram illustrating a point-to-point fixed wireless systems deployed in a hubbed network configuration in accordance with the prior art in which there is a one to one relationship between hub and customer building wireless systems. Areas of overlap illustrate a co-channel interference phenomenon encountered in point-to-point fixed wireless networks.
Figure 5:
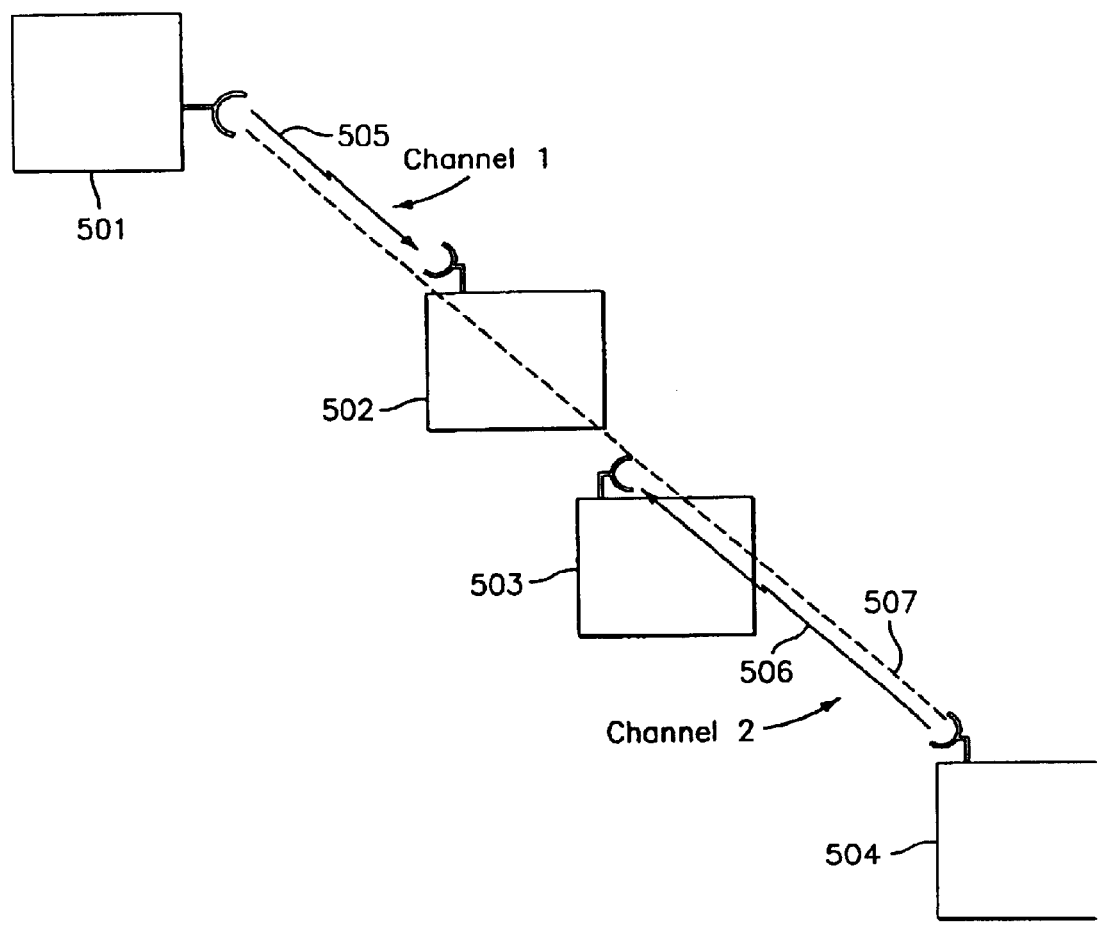
FIG. 5 is a diagram which illustrates another co-channel interference phenomenon encountered in point-to-point fixed wireless systems of the prior art.

The present hubbing architecture is applicable to both point-to-point and point to multipoint fixed wireless systems. In a point-to-point wireless system, each hub supports one antenna for each link it connects to the backbone network. Therefore, rooftop space imposes a limitation on the number of antennas (and thus links to the network) that can be supported by a single hub using point-to-point fixed wireless systems. FIG. 1 illustrates an embodiment of the network architecture employing millimeter microwave point-to-point wireless telecommunications systems in which the wireless facilities connect customer locations to a metropolitan area backbone network. This system employs a point-to-point system, in which communication occurs between a hub 100 and specific buildings 102 or campuses 104. The backbone network consists of high capacity telecommunications transport facilities 106 connecting the hubs in a ring configuration, with each hub connecting to individual buildings or campus locations over a "last mile" wireless connection.

In point to multipoint fixed wireless systems, a smaller number of hub antennas provides connections to customer buildings in a sector varying between 15 and 90 degrees and containing many customer buildings. In either case, the hubbing architecture provides efficient access to a network backbone thereby enabling communication between subscribers and allowing subscriber access to value added services attached to the network.

6. Remote Subscriber Systems Equipment and Services Support

Figure 8:
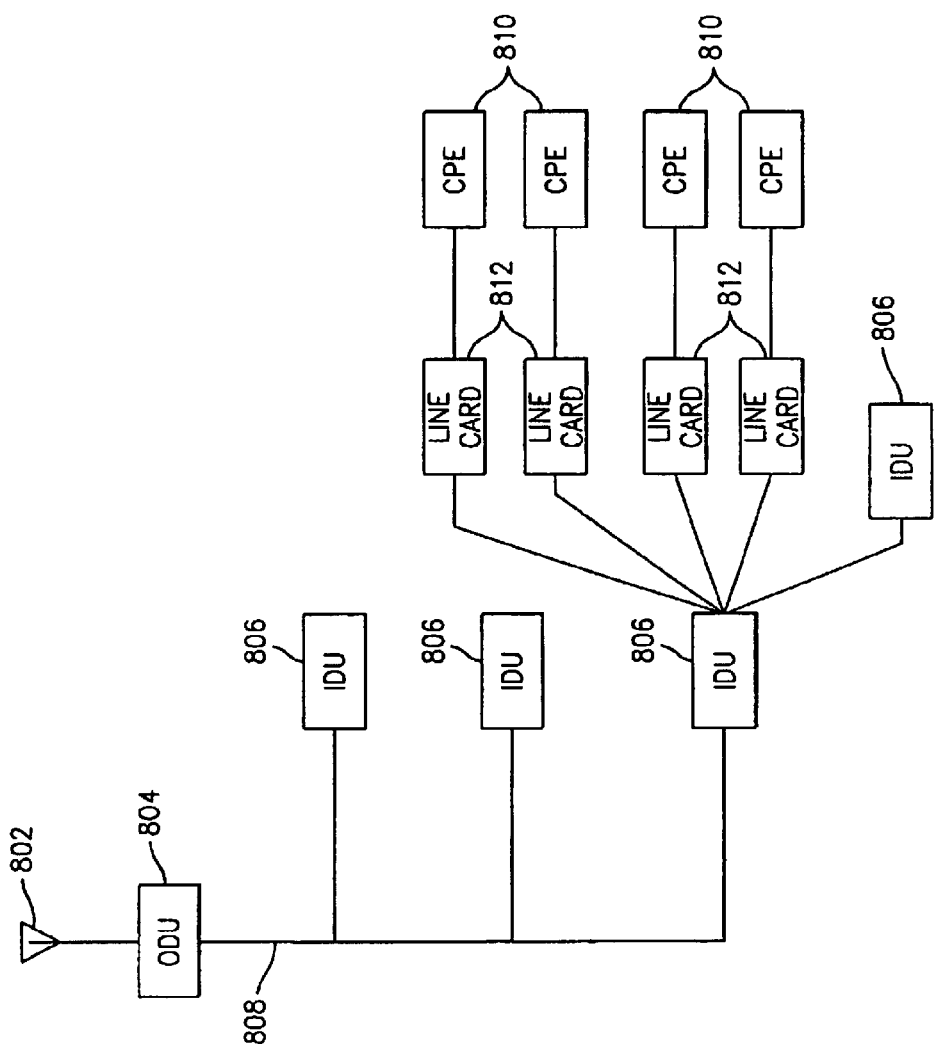
FIG. 8 is a block diagram of an embodiment subscriber system used in the present system.

In the present system, a subscriber 716 can take the form of a single customer, a multi-user system in a building or even a campus of customers. FIG. 8 illustrates an embodiment of a subscriber system for use with a multi-user system in a building.

Referring to FIG. 8, antennas 802 are integrated with radio transceivers in compact sealed outdoor units (ODU) 804 for installation on building rooftops. The ODU's are preferably secured by standard 4 inch pole mounts for rapid, low cost installation and non-obtrusiveness. Outdoor units 804 are connected to indoor units (IDU) 806 typically located in common space within a building via an inter-facility link (IFL) 808 consisting of either coaxial cable or fiber. By integrating the antenna and radio transceiver into an outdoor unit 804, signal losses at the millimeter microwave frequencies are minimized. This architecture also allows a flexible system approach where a common indoor unit 806 can be used with many different types of ODU 804 in order to operate in the various millimeter microwave frequency bands which are available world wide.

Utilizing fiber in the IFL 808 provides significant benefit in installations where in-building conduit is already tightly packed with telecommunications facilities and little room exists to pull new cable. This is a commonly encountered installation problem. Because fiber is much thinner than coaxial cable, it is much more readily pulled through existing building conduit than coaxial cable, making the job of installation much faster and less costly than would otherwise be the case.

Another advantage of using fiber in the IFL 808 has to do with signal loss between the IDU 806 and the ODU 804. Physical properties of coaxial cable limit signal propagation to less than 1000 feet in most cases. This places a limitation on the separation between the ODU 804 and the IDU 806 in a building. Since the common space provided for telecommunications equipment (including the IDU) in most commercial office buildings is located in the basement and the ODU 804 is roof-mounted, this poses a problem for installations in larger buildings of 15 floors or more. Fiber optic cable poses no such distance limitation, between the IDU 806 and the ODU 804. Thus installations are not hampered by the location of common space for telecommunications equipment in buildings.

Indoor units 806 are used to interface with customer premises equipment (CPE) 810. A preferred embodiment of the indoor unit includes a chassis with slots for receiving service specific line cards 812. Line cards 812 are physically inserted in the chassis when customers are installed, and are activated via software commands from a centralized network operations center. Line cards 812 are provisioned to support specific telecommunications services (DS-1, DS-3, ISDN, Frame Relay, Ethernet, Token Ring, ATM, etc.) The line cards 812 in turn connect to a backplane for protocol conversion to ATM for transmissions to the hub, and from ATM to service specific protocols for transmissions from the hub. A chassis can preferably support 10–20 line cards 812, each of which may provide multiple ports for interconnection with CPE. For example, a typical DS-1 line card permits the connection of 4 DS-1 lines (4×DS-1) per card. Line cards are inexpensive, thus the incremental cost to add customers to the network once the basic remote system equipment is in place in a building is quite low. Once installed, services provided by the line card 812 can be locally enabled, or preferably, remotely enabled by commands generated by the central operations node 713 (FIG. 7) which are transported over the network.

In this way, indoor units scale to cost effectively meet the demand for telecommunications services. Most small to mid-sized commercial office buildings can be supported by the 10–20 card chassis described above. In very large buildings, two or more IDUs can be interconnected in "daisy chain" fashion to expand the number of service interfaces available, and installed on different floors where common space and main distribution frames may be located to serve customers. The present invention also provides for very small, low cost indoor units with fixed service interfaces to serve Small Office/Home Office (SOHO) and residential customers. Rather than employing a chassis and backplane architecture, these small IDU's are fully integrated sealed units manufactured at low cost to support a predefined set of services. An example of a low-end IDU of this sort would provide interfaces for multiple 64 KB/s voice lines and an ISDN or Ethernet port for connection to a remote office LAN.

7. Operational Considerations

In addition to improved spectrum efficiencies and resulting bandwidth increases, significant operational and equipment costs savings are achievable with point to multi point radio technology at millimeter microwave frequencies. Operational complexities are eliminated by replacing multiple antennas .on a hub rooftop with one or more point to multi point hub antennas, and installation costs are likewise reduced. Once a hub 704 is installed, adding customers to the network becomes a matter of installing subscriber systems 716 in customer buildings within a covered section 706. This is in contrast to the requirement to engineer and install equipment supporting two ends of every link as in the case of today's point-to-point millimeter microwave wireless technology.

Also, service provisioning and configuration changes are manageable remotely via software definable service attributes downloaded through the network to subscriber systems located in customer buildings. Services are provisioned, monitored, modified and controlled from a central Network Operations Center by technicians with appropriate authorization. System software enables "see through" provisioning of services from the hub to the end-user service interface card in the remote subscriber system.

8. Services

The present network can support any and all services supportable by wire line telecommunications technologies. These services include two broadly defined categories: traditional telecommunications services and emerging broadband multimedia services.

Traditional telecommunications services for the commercial market include; (1) voice grade local and long distance services, (2) point-to-point dedicated facilities at DS-1, nxDS-1 and DS-3 speeds for voice and data, (3) switched data services such as switched 56 Kb/s and Frame Relay, and (4) high capacity point-to-point data facilities, operating at OC-3 speeds and above.

Emerging broadband multimedia services supported by the present network include high speed Internet access, web hosting and information services, native LAN-LAN services such as Ethernet and Token Ring, and video services such as desktop video conferencing, business related commercial video programming, and on-demand video training (distance learning). Wireless customer access links to the network are provisioned at virtually any data rate to meet the bandwidth requirements of such services.

Residential customers are provided services which include a subset of the above for telecommuting and Small Office/Home Office (SOHO) applications. A package of services for these customers may include local and long distance telephone service, high speed Internet access for information services and e-mail, and selectable video programming. Access to the network can be provisioned at any speed for residential customers as well.

ATM Quality of Service (QOS) parameters can be used to support usage based broadband multimedia data services. For example, a customer can subscribe to a 2 megabit Committed Information Rate (CIR) connection to the network. The overhead in this customer's ATM cells would guarantee 2 megabits of actual throughput each and every time the customer required this amount of bandwidth on the network. When the 2 megabits of network capacity (spectrum in a point to multipoint fixed wireless access network) is not in use by the customer, it is available for other transmissions on the network.

ATM QOS parameters can be used to provide varying levels of throughput on the network allowing network operators to establish pricing to coincide with these levels of throughput. For voice services which are particularly intolerant to the delays inherent in non-sequential cell transport. Permanent Virtual Circuits (PVC's) guarantee immediate throughput at predefined data rates. PVC's utilize constant fixed bandwidth in the network each time there is a request for service. Even though the delays associated with the re-sequencing of cells are measured in milliseconds, the accumulated effect of such delays can be detected by the human ear. PVC's overcome this problem in ATM networks by effectively establishing an end-to-end path through the network over which cells are sent sequentially. In essence, a PVC is a circuit switched connection through an ATM network. In fixed wireless point to multipoint networks, bandwidth is allocated on a full time basis between the subscriber system and the hub for the duration of the voice call.

Other ATM-based services are provisioned using Switched Virtual Circuits (SVC's) which allocate bandwidth to user transmissions according to a hierarchical priority scheme ranging from guaranteed data throughput rates to transport of data on a "capacity available" basis. SVC's most effectively support variable bit rate (bursty) data services such as LAN communications, with QOS parameters employed to manage throughput in relation to the criticality of the data and the cost of the service to the customer.

In the present network embodiments, event data is collected and stored on the system for billing based on the type of service provided to the customer. Billing for data services can take into account the time of day the service was provided, the network resources utilized by the customer (e.g., peak data rates, sustained data rates, number of packets/bytes transferred), Quality of Service provided, number of packets dropped due to congestion or other network transmission errors, and other factors not typically considered in billing algorithms for traditional telecommunications services. For voice services, billing data is collected from in traditional Call Detail Record (CDR) format by the switch equipment deployed in the network.

The point-to-multipoint broadband metropolitan area network of the present invention will support a broad range of future business and personal telecommunications services such as vehicular data applications using on-board computer systems that integrate city and highway road maps with global positioning data and local traffic information. Collision avoidance radar is another suitable vehicular application. Additionally point-to-multipoint networks can support a host of personal computing applications with wireless broadband connectivity, including personal digital assistants, hand-held Web terminals and campus-wide mobile LANs.

While the present system has been described with respect to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A broadband local metropolitan area telecommunication network providing fixed millimeter microwave band wireless local access comprising:

a plurality of subscribers, said plurality of subscribers including a subscriber radio unit, said subscriber radio unit operating on a millimeter microwave frequency corresponding to a cell sector in which said plurality of subscribers reside, at least one of said plurality of subscribers having a plurality of associated customer premise equipment and including means for performing statistical multiplexing among said customer premise equipment and said subscriber radio unit;

a plurality hub sites, said hub sites being interconnected by a Sonet based back bone; said hub sites including a plurality of hub site radio units, said hub site radio units operating on a selectable frequency with at least one of said subscriber radio unit, said plurality of hub sites including means for dynamically allocating communication bandwidth among said plurality of subscribers within each said cell sector;

a plurality of value added service nodes, said plurality of value added service nodes being coupled to said Sonet based back bone, said plurality of subscribers accessing said plurality of value added service nodes through said plurality of hub sites and said Sonet based back bone; and a central operations node, said central operations node being connected to each of said plurality of hub sites by a control network and providing remote control of said plurality of hub sites and remote control of said subscriber access to said plurality of value added service nodes.

2. The broadband local metropolitan area telecommunication network according to claim 1, wherein said plurality of value added service nodes include at least one of an Internet service node service, a long distance telephony service node, a local telephony service node, and a video service node.

3. The broadband local metropolitan area telecommunication network according to claim 1, wherein said at least one of said plurality of subscribers comprise:

an outdoor unit, said outdoor unit including a radio transceiver operatively coupled to an antenna;

a plurality of indoor units, said indoor units being operatively coupled to plurality of associated customer premises equipment; and an interfacility link, said interfacility link coupling said outdoor unit to said plurality of indoor units, whereby said radio transceiver supports said plurality of associated customer premises equipment.

4. The broadband local metropolitan area telecommunication network according to claim 3, wherein said plurality of indoor units further comprise:

a chassis, said chassis having receiving means for receiving a plurality of line cards; and a line card received by said receiving means, said line card providing a service specific interface between said chassis and at least one of said associated customer premises equipment.

5. The broadband local metropolitan area telecommunication network according to claim 4, wherein said interfacility link is a fiber link.

6. The broadband local metropolitan area telecommunication network according to claim 3, wherein said at least one of said plurality of subscribers is located at a multi story dwelling and at least one of said plurality of indoor units is installed at a plurality officers of the multi story dwelling.

7. The broadband local metropolitan area telecommunication network according to claim 1, wherein at least one of said plurality of subscribers is an integrated subscriber unit providing a selected service to said associated customer premise equipment.

8. The broadband local metropolitan area telecommunication network according to claim 1, wherein said plurality of hub radio units at each of said plurality of hub sites comprise:

a first sector radio unit operating on a first selectable millimeter microwave frequency and providing coverage in a first cell sector;

a second sector radio unit operating on a second selectable millimeter microwave frequency and providing coverage in a second cell sector, said second cell sector being substantially adjacent to said first cell sector; and means for frequency selecting said first selectable frequency and said second selectable frequency from a plurality of available frequencies such that said first and second selectable frequencies are substantially separated thereby minimizing co-channel interference.

9. The broadband local metropolitan area telecommunication network according to claim 8, wherein said plurality of hub radio units further comprise at least a third radio unit operating on a third selectable millimeter microwave frequency, said third radio unit providing further coverage in one of said first and second sectors, said means for frequency selecting further selecting said third selectable.

10. The broadband local metropolitan area telecommunication network according to claim 8, wherein each said hub site covers a plurality of adjacent and non-adjacent sectors and wherein said means for frequency selecting reuses said available frequencies on said non-adjacent sectors.

11. The broadband local metropolitan area telecommunication network according to claim 1, wherein said Sonet based back bone, said plurality of subscriber radio units, and said plurality of hub radio units each support a packet based data transfer protocol.

12. The broadband local metropolitan area telecommunication network according to claim 11, wherein said packet based transfer protocol is Asynchronous Transfer Mode.

13. The broadband local metropolitan area telecommunication network according to claim 11, wherein said packet based transfer protocol for hub to backbone communication includes both Asynchronous Transfer Mode and Synchronous Transfer Mode.

14. The broadband local metropolitan area telecommunication network according to claim 1, wherein said plurality of subscriber radio units and said plurality of hub radio units transfer data on a millimeter microwave frequency channel using high order modulation.

15. The broadband local metropolitan area telecommunication network according to claim 14, wherein said high order modulation is one of 16 QAM and 64 QAM.

16. The broadband local metropolitan area telecommunication network according to claim 12, wherein said central operations node includes means for collecting packet quality and packet volume data related to said subscribers, said data being provided to a billing system.

17. A broadband local metropolitan area telecommunication network providing fixed millimeter microwave band wireless local access to subscriber radio units in a plurality of sectors, said network comprising:

a selectable frequency corresponding to each sector in the plurality of sectors;

a hub node providing coverage in each of the plurality of sectors, said hub node each including a hub radio unit operating on said selectable frequency, said hub node each including means for dynamically allocating communication bandwidth among the subscriber radio units within each of the plurality of sectors;

plurality of value added service nodes;

a Sonet based back bone interconnecting said hub nodes and said plurality of value added service nodes such that the subscriber radio units can access said plurality of value added service nodes through said hub sites, and a central node being interconnected to said hub nodes, said central node providing for remote control of said hub nodes and providing for remote control of access to said plurality of value added service nodes by the subscriber radio units.

18. The network according to claim 17, wherein said plurality of value added service nodes includes a node selected from the group consisting of an Internet service node, a long distance telephony service node, a local telephone service node, a video service node, and any combinations thereof.

19. The network according to claim 17, wherein said hub radio unit comprises:

a first sector radio unit operating on a first selectable millimeter microwave frequency and providing coverage in a first sector and a second sector radio unit operating on a second selectable millimeter microwave frequency and providing coverage in a second sector, said second sector being substantially adjacent to said first sector; and means for frequency selecting said first selectable frequency and said second selectable frequency from a plurality of available frequencies such that said first and second selectable frequencies are substantially separated thereby minimizing co-channel interference.

20. The network according to claim 17, wherein said Sonet based back bone, and said hub radio units each support a packet based data transfer protocol.

21. The network according to claim 20, wherein said packet based transfer protocol is a protocol selected from the group consisting of Asynchronous Transfer Mode, Synchronous Transfer Mode, and combinations thereof.

22. The network according to claim 17, wherein said selectable frequency is a millimeter microwave frequency channel using high order modulation.

23. The network according to claim 22, wherein said high order modulation is one of 16 QAM and 64 QAM.

24. A broadband local metropolitan area telecommunication network providing fixed millimeter microwave band wireless local access comprising:

a plurality of subscribers each including a subscriber radio unit operating on a millimeter microwave frequency corresponding to a cell sector in which said plurality of subscribers reside;

a plurality hub sites interconnected by a Sonet based back bone, said plurality of hub sites including means for dynamically allocating communication bandwidth among said plurality of subscribers;

a plurality of hub site radio units disposed at each of said plurality hub sites, each of said plurality of hub site radio units operating on a selectable frequency with at least one of said subscriber radio units;

a plurality of value added service nodes coupled to said Sonet based back bone, said plurality of subscribers accessing said plurality of value added service nodes through said plurality of hub sites and said Sonet based back bone; and a central operations node connected to each of said plurality of hub sites by a control network and providing remote control of said plurality of hub sites and remote control of said subscriber access to said plurality of value added service nodes.

* * * * *